Aug. 16, 1960     K. E. VAUGHN     2,949,196
BALE BINDERS
Filed Sept. 8, 1958
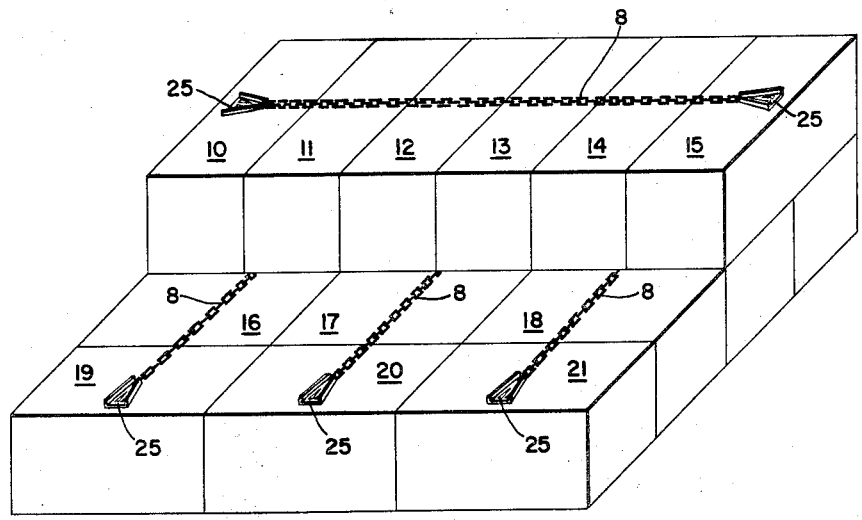
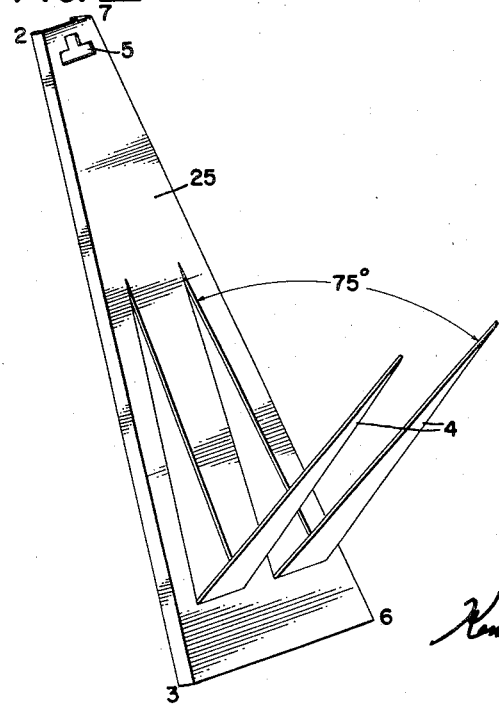
INVENTOR
Kenneth E. Vaughn

United States Patent Office 2,949,196
Patented Aug. 16, 1960

2,949,196

BALE BINDERS

Kenneth E. Vaughn, Box 195, Rush City, Minn.

Filed Sept. 8, 1958, Ser. No. 759,782

1 Claim. (Cl. 214—10.5)

This invention relates to a particular device made for the express purpose of securely binding together, rows of rectangular shaped bales of materials.

Bales of hay, straw, cotton, rags, or any other material are subject to shifting while on carriers or in storage piles. The object of this invention is to provide a simple, inexpensive means of tying a series of such bales in rows thereby preventing the bales from shifting out of place during transport or while in storage. Positioning of the "bale binders" and the system of chain and key tightening makes this a simple effective operation.

"Bale binders" are used in pairs with a light chain between them. The method of use is to place one "bale binder" on the outside of a pile or load of bales with the prongs facing down; then proceed to step on the "bale binder" thereby forcing the prongs into the bale. In a like manner, the prongs of another "bale binder" are forced into another bale on the opposite side of the pile or load of bales; then the chain which has been placed through the key shaped holes is drawn up tight thereby holding the row of bales in place.

The features of the invention will appear more fully from the following descriptions when taken in connection with the accompanying drawings. The drawings are used only for the purpose of illustration of the invention and are not intended to limit their use to this particular purpose.

In the drawings like reference numbers indicate like parts.

Fig. I shows a perspective view of a series of bales bound together with my novel binder. Fig. II shows a perspective view of one of the binders.

Fig. II is a perspective view of a "bale binder" showing its general shape with the location of the prongs 4 and the key shaped chain hole 5. The drawing, Fig. II, is approximately one-half the size of the "bale binder" itself. The prongs extend out from the main body at an angle of approximately seventy-five degrees, as shown in Fig. II, thereby tending to hook into the bale rather than to slip out when tension is put on the chain. Several sets of "bale binders" would be used on each pile or load of bales, to securely hold the bales in place.

In referring to Fig. I, there is shown a series of bales; 10, 11, 12, 13, 14, and 15, each of which is a rectangular-shaped bale, laid in a line, with "bale binders" placed into position in bales 10 and 15. The chain 8 between the bale binders is drawn taut thereby holding the bales against movement between one another. The group of bales will then be held as a single unit, thereby improving their ability to withstand jostling during transportation or shifting during storage. Likewise visible bales in the tier below are held in position by "bale binders" in bales 19, 20, and 21.

"Bale binders" are made of sheet metal approximately three-sixteenths of an inch in thickness; punched out of sheet metal strips by a punch press. The second operation of the punch press is the cutting and forming of the prongs 4 in the drawings; and the cutting of the key shaped hole 5, shown in Fig. II. The length of the "bale binders" as shown in Fig. II as the distance between lines 2 to 7 and 3 to 6 is approximately ten inches.

What is claimed is as follows:

To be used in combination with a plurality of rectangular bales of material arranged side by side in a row, a pair of binding devices, each comprising a flat sheet steel base with a T-shaped hole adjacent one end and prongs protruding outwardly therefrom at an angle of approximately seventy-five degrees adjacent the other end and a connecting chain, which is engaged in the holes in the devices, and extending across the top of the row of bales; thereby binding the bales together.

References Cited in the file of this patent

UNITED STATES PATENTS 2,792,129     Muirhead _____ May 14, 1957

FOREIGN PATENTS 28,140     Sweden _____ Jan. 10, 1910